United States Patent
Rockwell et al.

(10) Patent No.: US 9,806,831 B1
(45) Date of Patent: Oct. 31, 2017

(54) METHOD AND APPARATUS FOR RADIO SIGNAL STRENGTH DETECTION AND REPORTING

(71) Applicant: FORD GLOBAL TECHNOLOGIES, LLC, Dearborn, MI (US)

(72) Inventors: Mark Anthony Rockwell, Wyandotte, MI (US); John William Schmotzer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/227,279

(22) Filed: Aug. 3, 2016

(51) Int. Cl.
| H04B 17/318 | (2015.01) |
| H04W 4/02 | (2009.01) |
| G08G 1/127 | (2006.01) |
| G07C 5/02 | (2006.01) |
| G01S 19/13 | (2010.01) |

(52) U.S. Cl.
CPC ............ *H04B 17/318* (2015.01); *G01S 19/13* (2013.01); *G07C 5/02* (2013.01); *G08G 1/127* (2013.01); *H04W 4/028* (2013.01)

(58) Field of Classification Search
CPC combination set(s) only.
See application file for complete search history.

(56) References Cited

U.S. PATENT DOCUMENTS

| 6,947,703 | B2 | 9/2005 | Ceresoli et al. |
| 2004/0203436 | A1* | 10/2004 | Oesterling ............ H04B 17/20 455/67.11 |
| 2006/0105702 | A1 | 5/2006 | Muth et al. |
| 2008/0291086 | A1* | 11/2008 | Walley .................. G01S 5/0263 342/367 |
| 2009/0228199 | A1* | 9/2009 | Bhogal ............. G01C 21/3461 701/425 |
| 2011/0046968 | A1 | 2/2011 | Hawthorne, III et al. |
| 2014/0018006 | A1 | 1/2014 | Petrucci et al. |
| 2015/0295668 | A1 | 10/2015 | Placide |
| 2016/0182173 | A1* | 6/2016 | Williams ............... H04H 40/18 455/164.1 |

* cited by examiner

*Primary Examiner* — Junpeng Chen
(74) *Attorney, Agent, or Firm* — Jennifer Stec; Brooks Kushman P.C.

(57) ABSTRACT

A system includes a processor configured to determine signal strength of a broadcast radio signal received at a vehicle. The processor is also configured to wirelessly transmit the determined signal strength, a corresponding radio station identifier and GPS coordinates where the vehicle was located when the signal strength was determined to a remote server responsive to occurrence of one or more predefined reporting conditions.

9 Claims, 4 Drawing Sheets

METHOD AND APPARATUS FOR RADIO SIGNAL STRENGTH DETECTION AND REPORTING

TECHNICAL FIELD

The illustrative embodiments generally relate to a method and apparatus for radio signal strength detection and reporting.

BACKGROUND

Radio stations have a generalized broadcast range that is typically defined by the area in which a broadcast radio signal remains strong enough for receipt and decoding by a receiver. Within a given broadcast range, however, a number of factors can cause interruptions and diminished signal strength. These include, for example, interfering signals from other broadcasts, terrain (man made and natural), weather and atmospheric conditions.

Determining the broadcast range of a particular station can be difficult, because many of the signal strength affecting conditions can vary on a day by day basis. There are certainly areas in which a signal is always received or never received, but for a significant portion of a broadcast range, especially around the outer edges, the variance in day-to-day transmission ranges can be significant. Because so many uncontrollable factors impact broadcast range, it can be difficult to determine even a rough edge of a range. This presents obstacles to defining a listening audience and station's "reach," which in turn presents difficulties in advertising sales. Daily changes in which stations are available where may also frustrate drivers who travel frequently within the fringes of broadcast ranges.

SUMMARY

In a first illustrative embodiment, a system includes a processor configured to determine signal strength of a broadcast radio signal received at a vehicle. The processor is also configured to wirelessly transmit the determined signal strength, a corresponding radio station identifier and GPS coordinates where the vehicle was located when the signal strength was determined to a remote server responsive to occurrence of one or more predefined reporting conditions.

In a second illustrative embodiment, a system includes a processor configured to determine that a vehicle is projected to receive a radio signal below a threshold for a currently-tuned radio station, at a first location along on a current route. The processor is also configured to determine if the radio signal is projected to exceed the threshold at a subsequent location on the current route and provide a recommended alternative station if the radio signal is not projected to exceed the threshold at the subsequent location.

In a third illustrative embodiment, a computer-implemented method includes wirelessly transmitting a broadcast radio signal strength, a radio station identifier and vehicle GPS coordinates, responsive to the occurrence of a predefined reporting condition occurring at a vehicle, wherein the broadcast radio signal strength is determined by the vehicle for a radio station corresponding to the radio station identifier.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
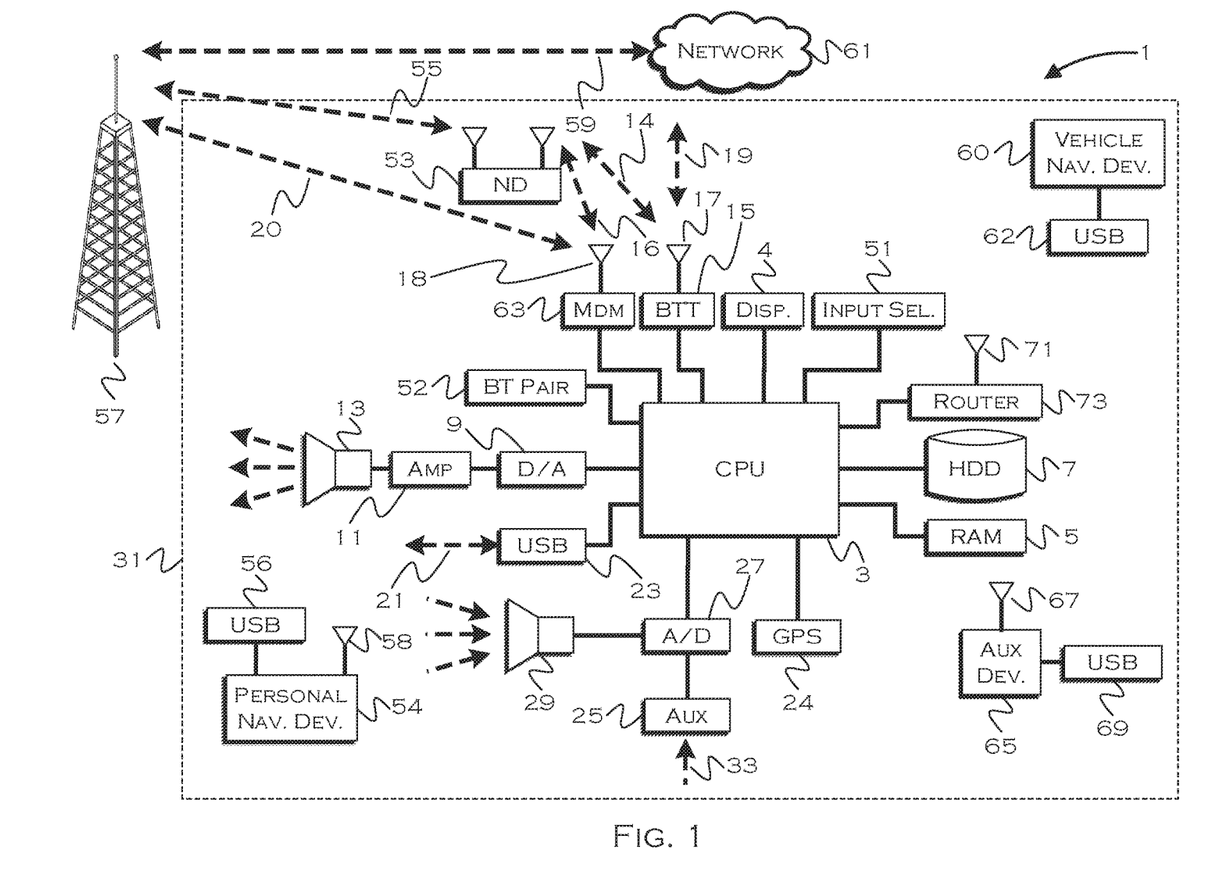
FIG. 1 illustrates an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLU- ETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The proposed embodiments and the like present methods for both gathering radio signal strength data and using the gathered data. Radio stations can benefit greatly from large sampling of broadcast ranges. This data allows the station to better define listening audience size, demographics of listening audience, and advertising parameters. Similarly, advertisers can benefit from the same aspects of the data, by being able to double check projected target audience size and demographics, as well as location.

Day to day users of in-vehicle radios benefit from the information as well. The illustrative embodiments propose options for providing advice about a fading or soon-to-be fading radio signal, which include alternative options or a level of assurance that a signal will resume shortly along a planned route.

Figure 2:
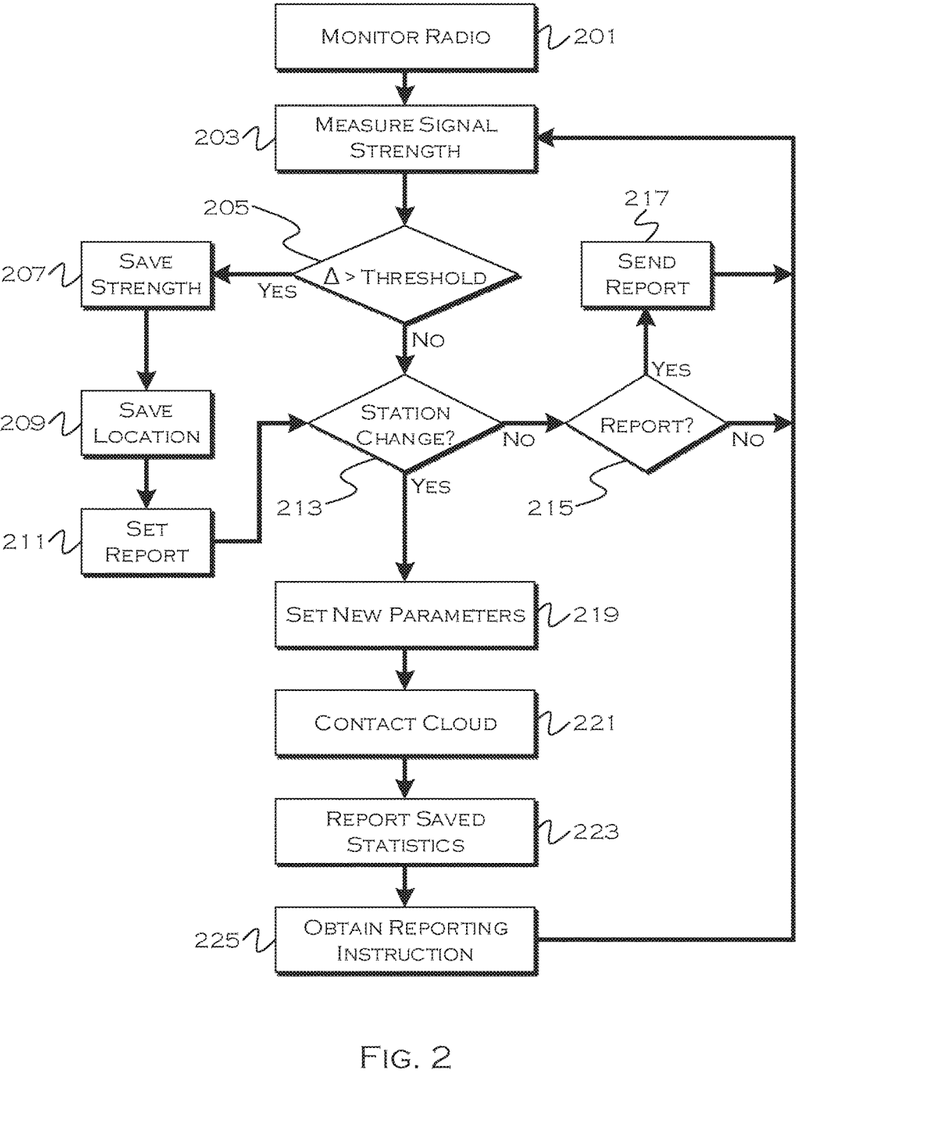
FIG. 2 illustrates an illustrative process for signal strength capture and reporting.

FIG. 2 illustrates an illustrative process for signal strength capture and reporting. The illustrative embodiments employ crowdsourced signal strength data to obtain a large number of data points at a relatively low impact and cost. FIG. 2 demonstrates one example of how a single vehicle can gather and report signal strength data. Multiplying this data gathering capability to all the vehicles traveling within the present area of a station broadcast range demonstrates how quickly and accurately a current map of the broadcast range can be achieved.

In this example, the particular vehicle executing the process monitors a radio signal for a station to which a driver has tuned a vehicle radio 201. Depending on the value of the gathered data, it is even possible to configure a vehicle with one or more secondary antennas and tuners, provided solely for the purpose of gathering radio data. Or a vehicle computer could retask a main antenna and tuner to gather this information in the background (no audio output) while the driver was using a non-radio aspect of an entertainment system. Since the vehicle can take strength measurements fairly quickly, a computer-controllable tuner could be caused to track a single station over a drive or cycle through a series of requested stations and gather a large amount of data while the driver was using other entertainment aspects of the vehicle. Because modern radios are digitally tunable, the system could preserve a last-station in memory and immediately switch to the last-station if the driver requested use of the radio. Other than any cost involved in transferring signal data to a remote server for handling, such a system could be rendered essentially impactless on a driver experience.

At periodic intervals, or persistently, the monitoring process records the currently measured received signal strength of the incoming radio signal 203. The vehicle can constantly record this data. In other systems, the vehicle can report or use the data in an appropriate manner if a particular change or low level is noted, otherwise discarding the data while the signal strength remains at acceptable levels.

In this process, if the vehicle detects a change in signal strength between a last measurement and a present measurement of over a certain threshold 205, the process will save the new strength measurement 207 and current station identification. The vehicle also saves the current GPS location where the new signal was measured 209, so that the approximate point of signal change is known. The information could also include a timestamp, which the vehicle can also report. The vehicle includes this data in a current report, or sets a report 211 for delivery if no current report is pending (e.g., if the vehicle has nothing yet useful to report). Also, it is possible that signals below (or above) a certain threshold can result in tracking, which may be useful if signals gradually decay over the course of a journey, such that the change-threshold is never triggered. The thresholds can be defined based on known usable signal strength levels, for example, or other data-gathering-party-defined parameters that are considered to be useful triggers for data recordation.

If the vehicle did not detect a change triggering a data save, or once the vehicle completes the data save and report creation/editing, the vehicle determines if a station has been changed 213. If there was no change to the station, the vehicle determines if reporting is appropriate 215. Reporting 217 can occur at any time, and can be requested by the remote server processing the reported data. Reporting can also occur at fixed intervals or when the vehicle gathers a certain amount of data or particularly relevant data, for example. Relevant data may include, but is not limited to, drop of signal below a threshold (signaling a "dead" area), unexpected signal strength (both high and low), etc. A user may also define a preferred data packet size, and the vehicle can report the data once an amount of data to produce the preferred packet size has been gathered. In some examples, a customer (station, advertiser, etc) may want a current snapshot of measured broadcast range, so some or all vehicles within a threshold distance of expected range could be requested to take a measurement of a particular radio signal strength and report.

If a vehicle occupant has changed the radio station, the vehicle will set new parameters for recording and reporting the signal strength of the new station 219. Different radio stations may have different recording and reporting parameters associated therewith. Some stations may pay for increased reporting, other stations may not request reporting at all and the vehicle may periodically gather data for these stations for vehicular or other internal use.

Once a user has changed the radio station, in this example, the vehicle wirelessly contacts a remote reporting server 221. The vehicle then reports any statistics/strength measurements previously saved for the previously-tuned station 223. Also, the vehicle can obtain any new reporting instructions with respect to reporting in general or with respect to a present or other stations 225. If a user is scanning through radio stations, the vehicle may generate brief reports for a number of stations, and to accommodate this, reporting may be limited as previously noted, such as when a predefined amount of data is present. As the drive and radio use continues, the vehicle will continue to monitor and record relevant signal strength data.

Figure 3:
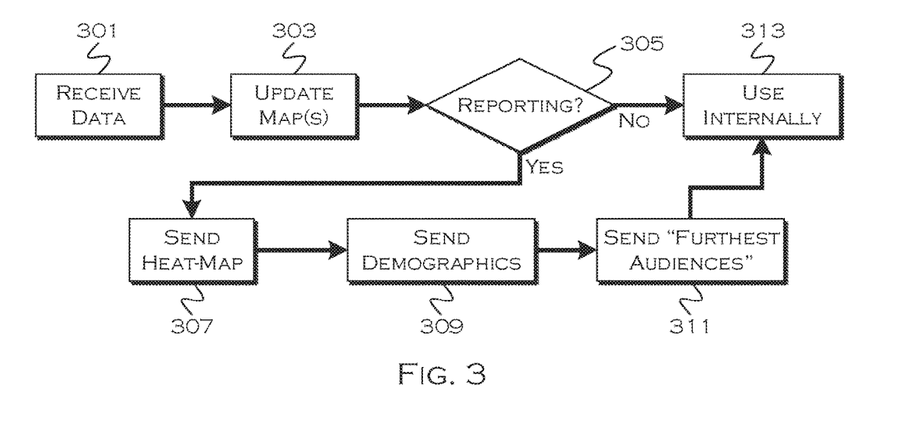
FIG. 3 illustrates an illustrative signal strength data gathering process.

FIG. 3 illustrates an illustrative signal strength data gathering process. In this illustrative example, a backend server receives data wirelessly sent from a reporting vehicle 301. This data can relate to measured signal strengths of one or more radio stations, and may include at least radio station identifications for each recorded strength or set of recorded strengths and GPS data indicating vehicle positions at the time of each recording.

The backend server, in this example, tracks signal strength data by generating heat-maps or other graphic representations of strength 303. A broad form of a heat map can show, for example, all detected instances of strength above a threshold reported by all vehicles within a broadcast range. Depending on vehicle concentration, this map will roughly reflect a higher clustering of reported strengths above a threshold in areas with persistently strong coverage (although this could be skewed by a large concentration of vehicles at the fringe of a zone). Over a long enough period of time, reported clusters of strong signals should accurately define a reasonable minimum coverage range of broadcasts for a particular station.

With sufficient reporting, a snapshot heat map could also be generated, wherein all vehicles currently within a set of coordinates (determined to approximate an expected broadcast area, including a tolerance threshold) report presently observed signal strengths. This can provide a number of useful points of information, such as number of current listeners, locations and clustering of current listeners, current practical broadcast coverage (defined by outer-edge listeners), etc. Advertisers interested in targeting drivers in certain areas could also utilize such a feature to determine if sufficient listeners in a targeted area were receiving an advertisement at a particular time. This could be especially useful for time-of-day targeted advertising, such as a restaurant might desire.

The server also determines if any secondary sources have requested reporting 305. The server could be designed to periodically report or update data available to secondary sources (radio stations, advertisers, etc) or could be receiving data in response to a specific report request. If any secondary reporting is needed, the server can send the heat map 307 (or other representation of the data, which could just include raw data) to the requesting party. In other examples, the server may consistently or periodically update a customer-accessible database or website with the data as it arrives.

In this example, the server is managed by an original equipment manufacturer (OEM) who may have additional information about vehicle occupants. Demographic information about owners, occupants and drivers may be obtained and known from a variety of sources. The OEM can provide some of this information 309 (appropriately scrubbed of personal data, if desired) along with a data report. So, for example, if a 2014 FORD FOCUS reported data, and the OEM (FORD) knew that the vehicle currently contained a 37 year old driver and her 10 year old male child, the report could include demographic information about the reporting listeners. Gathering data about the makeup of current vehicle occupants can be done through a variety of processes not covered by the present application. Generally, at least occupant number and more specific owner/driver demographics may be known through relatively simple data gathering, and advanced data gathering can provide a variety of information such as sexes, ages, other listening preferences, advertising-responsiveness, etc.

Also, in this embodiment, as another example of specific data characteristics that the system can report, the server reports one or more "outermost" listeners 311. These can represent all listeners reporting data along an outer boundary defined by connecting all of the outermost data points, for example. It is also worth noting that while the illustrative embodiments are described with respect to automobiles, any radio reception device can be provided with certain aspects of the embodiments, so that reporting (live or later-in-time) can be obtained from a variety of radio-receiving sources.

Whether or not a secondary customer has requested external reporting of the gathered data, the server can also use the gathered data for a variety of primary customer (driver) assistance features 313 and for other internal mapping and demographic determinations.

Figure 4:
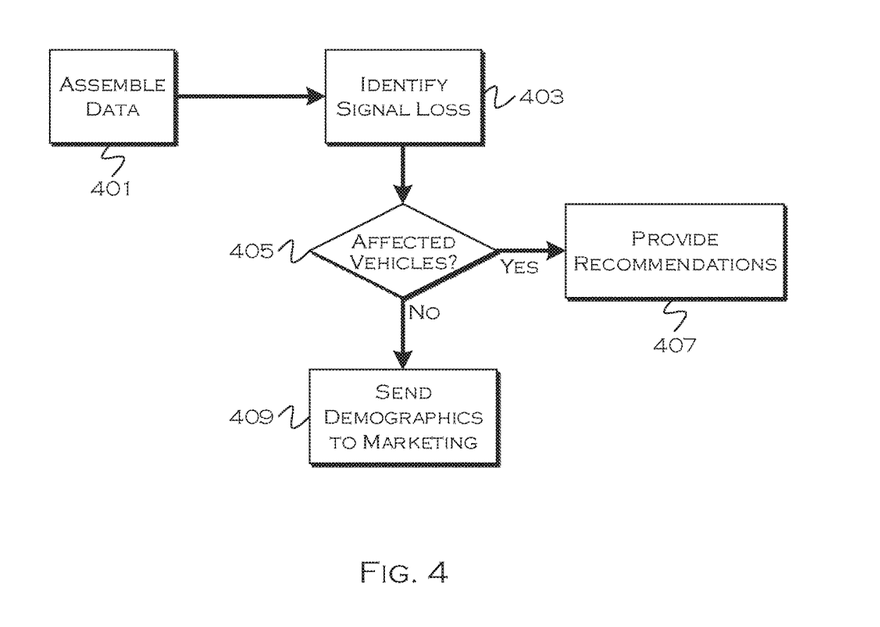
FIG. 4 illustrates an illustrative signal loss handling process.

FIG. 4 illustrates an illustrative signal loss handling process. This is an example of how the backend server may assist current drivers on the road. Since the backend server is a repository of a potentially vast set of data relating to both historical and present broadcast area definitions for a given radio station, along with determinations of temporary loss features such as dead zones, the server can use this data to provide recommendations and assistance to drivers. This can include informing a driver of alternative, similar stations, an upcoming signal loss and the fact that an upcoming signal loss is likely temporary, among other things.

This process is one example of an internal (OEM-centric) use 313 of data. The backend server gathers data 401 from all reporting vehicles (and other sources) as the vehicles report signal strengths observed at various locations over which the vehicles travel. By gathering a sufficient amount of data and/or through spot observation of present conditions, the server can identify both persistent and temporary areas of signal loss 403. The persistent areas include areas where a variety of vehicles, over time, have reported loss or lack of signal for a particular station. The temporary areas include areas where one or more vehicles have recently (within a time-threshold) reported loss or lack of signal.

Since the backend server can communicate with traveling vehicles, the server could either identify vehicles that may be affected by signal loss (if the vehicles self-report locations) or can broadcast out one or more recommendations that include candidate coordinates for signal loss and candidate actions for accommodating signal loss. In one example, if the server interacts with a route generation process, the server can identify areas of known signal loss for a prepared route. The server can send this information supplementally to a vehicle to which the route is sent, along with any appropriate recommendations for handling signal loss. For example, the server could note that 97.5 FM will be lost temporarily at one point along a route and consistently past a second point along the route. The recommendation for the temporary loss could include a notice to the driver that the signal will likely resume, and the recommendation for the consistent loss could include recommendation of a station providing similar content (or an alternative broadcast from the same station). The server could provide similar identifications and recommended actions in broadcasts sent over a network to all vehicles or all vehicles traveling within certain coordinate regions or geographic locations.

In this example, the server knows the locations of one or more candidate vehicles (based on route generation, self-reporting of coordinates, etc). If any of the vehicles are expected to encounter signal loss 405, the server will report the type of expected loss and any recommended action 409. This reporting could also be done with respect to data-gathering vehicles only (incentivizing participation in data-gathering while at the same time providing a flow of reported coordinates and current station for each data-gathering vehicle). Or the reporting could also take into consideration a current station for any given vehicle to which the server is sending information (assuming the vehicle reports the current station). A generalized broadcast of information will render it less necessary to know vehicle specifics, but may consume much unnecessary bandwidth, so the particular solution chosen can be determined based on the needs and constraints of a given system.

In addition to providing recommendations to one or more traveling vehicles, the server can send the information to internal marketing 407, which could be useful, for example, if the server-provider was a vehicle OEM. This can include advanced demographic data (since the use is internal and the demographics are already known by the OEM) which is less-scrubbed than externally transmitted demographic data. Also, since automotive OEMs (especially with respect to their dealers) advertise significantly on the radio, knowledge of vehicle types and listening habits and locations of the drivers of certain models can help provide targeted advertising strategies designed to reinforce a brand or encourage upgrade to a different model.

For example, if 88.8 FM users typically drove used cars and new vehicles costing less than $25,000 (all easily observable through the illustrative reporting with respect to the OEM's own reporting models), advertising $60,000 luxury vehicles on this station may be somewhat pointless. Advertising slight upgrades or newer models of similar cost to these users might be effective, however. And since any new vehicles will continue to report the signal strength demographics along with the listened-to station, such reports can be assessed to determine if over time the reports come from an upgraded "fleet" of listeners (demonstrating the efficacy of the advertising, to some extent). While this data could all be gathered in the absence of signal strength reporting (for example, by simply requesting that vehicles report listened-to radio stations), the inclusion of signal strength reporting increases the value of the data and allows for additional secondary markets that may be interested in other aspects of the data.

Figure 5:
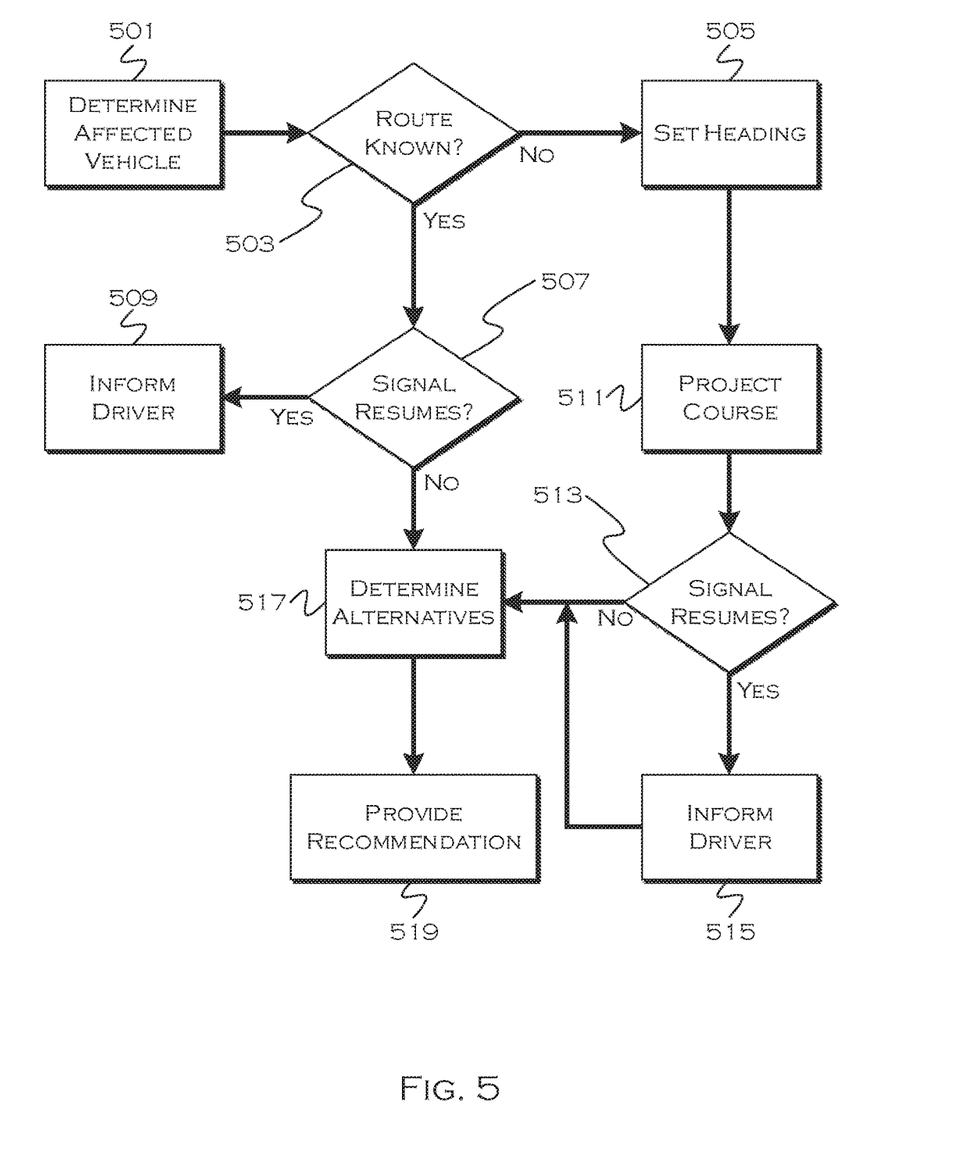
FIG. 5 illustrates an illustrative listening-assistance process.

FIG. 5 illustrates an illustrative listening-assistance process. In this example, a vehicle reports to the server that it has experienced some form of signal loss for a current radio station. This represents another type of assistance to vehicle drivers, in an on-demand format.

The server receives the report/inquiry from the affected vehicle 501, which may also include current vehicle GPS coordinates, a destination, a route, and any other information useful to determine a strategy for improved radio usage. If the route is known 503 (received by the server, already stored by the server, predictable based on received destination, etc), the server will determine if the fading/lost signal is known to increase in strength to a suitable level (the signal resumes) along the route 507. If so, the server will report to the vehicle (which the vehicle can relay to the driver) driver that the signal can be expected to resume 509. This report can include an expected time or distance until resumption, or an expected location for resumption. The report can also include alternative actions, such as stations with similar content. In some examples, if the signal loss is expected to last for more than a threshold time, and then resume, an automatic or selectable option to switch stations temporarily can be provided. When a point where the signal is expected to resume is reached (or if a signal strength for the old station is detected above a threshold), the system can automatically switch back. This could be useful, for example, with respect to a traveler listening to a sports broadcast, where persistent coverage is of more interest than particular content provider.

If the route is known and the signal is not expected to resume (either the signal stays low or degrades further until total loss), the server can determine one or more alternative stations likely to provide similar content 517 and provide recommendation to switch to one of these stations to the vehicle 519. The driver can select an alternative from these stations or the vehicle could automatically switch to another station, depending on configurable vehicle settings. The particulars of similar content could be based on a database of similar radio stations or even based on a pay-per-recommendation model (which may prioritize one similar station over another).

If the route is unknown, the server may have at least received (or may request) the current vehicle location and heading 505. Based on a current road, the server may project a vehicle course 511. More advanced predictive techniques can also be used to predict a vehicle course, but in this example it is assumed that the vehicle will at least travel on the same road in the same direction momentarily (enough time to identify certain signal loss characteristics). If the signal resumes just ahead of the vehicle along the road (or, for example, along all possible alternative turn-offs ahead of the vehicle), representing a dead zone in which the vehicle is currently traveling, the server can inform the vehicle/driver of the temporary loss 515. If the signal does not resume along a present and/or possible alternative travel routes, the process can skip to the alternative-recommendation step 517. Also, in this example, since the server may not be able to accurately predict the vehicle route, the driver is also provided with alternatives even if a dead-zone is encountered.

Through measurement and reporting of received radio-station signal strength in accordance with the illustrative embodiments and the like, improved understanding of a radio station's broadcast range and listening demographics can be achieved. Broadcasters and advertisers can both benefit from this improved information. By gathering the data from a large number of vehicles and/or over a sustained period of time, OEMs can make improvements to both driver experiences and internal advertising procedures. Coupling the data with known or other gathered demographic data can further improve the quality of results and understanding of a variety of aspects related to radio broadcast usage.

While exemplary embodiments are described above, it is not intended that these embodiments describe all possible inventive forms. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine that a vehicle is projected to receive a radio signal below a threshold for a currently-tuned radio station, at a first location on a current route; and
notify a driver of projected signal-loss at the first location and that the signal-loss will only be temporary, responsive to determining that the radio signal is projected to exceed the threshold at a subsequent location on the current route.

2. The system of claim 1, wherein the notification includes a distance to the subsequent location from a current vehicle location.

3. The system of claim 1, wherein the notification includes a travel time to the subsequent location from a current vehicle location.

4. The system of claim 1, wherein the processor is configured to notify a driver of a distance to the first location from a current vehicle location.

5. The system of claim 1, wherein the processor is configured to notify a driver of a travel time to the first location from a current vehicle location.

6. The system of claim 1, wherein the processor is configured to notify a driver of a distance from the subsequent location to the current location.

7. The system of claim 1, wherein the processor is configured to notify a driver of a travel time from the subsequent location to the current location.

8. The system of claim 1, wherein the processor is further configured to notify a driver of a distance between the first location and the subsequent location.

9. The system of claim 1, wherein the processor is further configured to notify a driver of a travel time between the first location and the subsequent location.

\* \* \* \* \*